United States Patent
Le Faucheur et al.

(10) Patent No.: US 7,738,382 B2
(45) Date of Patent: Jun. 15, 2010

(54) HIERARCHICAL MULTI-RATE MULTI-PRECEDENCE POLICER

(75) Inventors: Francois Le Faucheur, Valbonne (FR);
Anna Charny, Sudbury, MA (US);
Sandeep Bajaj, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 915 days.

(21) Appl. No.: 11/019,915

(22) Filed: Dec. 21, 2004

(65) Prior Publication Data

US 2006/0133279 A1   Jun. 22, 2006

(51) Int. Cl.
*H04J 1/16* (2006.01)
*H04J 3/14* (2006.01)
*H04L 1/00* (2006.01)

(52) U.S. Cl. .................................. 370/235.1
(58) Field of Classification Search ................ 370/235, 370/235.1
See application file for complete search history.

(56) References Cited

U.S. PATENT DOCUMENTS

2003/0152084 A1* 8/2003 Lee et al. ................ 370/395.21
2006/0133279 A1* 6/2006 Le Faucheur et al. ....... 370/235

OTHER PUBLICATIONS

Heinanen et al., IETF RFC 2698, "Two Rate Tree Color Marker", Sep. 1999.*
Shenker et al., IETF RFC 2212, "Specification of Guaranteed Quality of Service", Sep. 1997.*
F. Baker et al., "Implementing MLPP for Voice and Video in the Internet Protocol Suite", IETF Internet Draft, Feb. 15, 2004.
F. Baker at al., "MLEF Without Capacity Admission Does Not Satisfy MLPP Requirements", IETF Internet Draft, Feb. 15, 2004.
A. Charny et al., "Supplemental Information for the New Definition of the EF PHB (Expedited Forwarding Per-Hop Behavior)", RFC 3247, Internet Engineering Task Force, Mar. 2002.
B. Davie et al., "An Expedited Forwarding PHB (per-Hop Behavior)", RFC 3246, Internet Engineering Task Force, Mar. 2002.
J. Heinanen et al., "A Two Rate Three Color Marker", RFC 2698, Internet Engineering Task Force, Sep. 1999.
J. Heinanen et al., "S Single Rate Three Color Marker", RFC 2697, Internet Engineering Task Force. Sep. 1999.
M. Pierce et al., "Requirement for Assured Service Capabilities in Voice over IP", IETF Internet Draft, Jun. 23, 2003.

* cited by examiner

*Primary Examiner*—Seema S Rao
*Assistant Examiner*—Jianye Wu
(74) *Attorney, Agent, or Firm*—Cindy Kaplan

(57) ABSTRACT

A hierarchical multi-rate multi-precedence policer is disclosed. The policer discards packets based on assigned precedence levels. When traffic exceeds an available service rate, the policer drops packets of lower precedence levels to make room for packets of higher precedence levels. In certain implementations, the policer also guarantees bandwidth to each level, thus preventing complete loss of lower precedence traffic when there is a large amount of higher precedence traffic.

29 Claims, 11 Drawing Sheets

HIERARCHICAL MULTI-RATE MULTI-PRECEDENCE POLICER

BACKGROUND OF THE INVENTION

The present invention relates to data networking and, in certain implementations to the operation of a policer.

The Defense Information Systems Agency of the United States Department of Defense, with its contractors, has proposed a service architecture for military (NATO and related agencies) telephone systems. This is called the Assured Service, and is defined in two documents: Pierce, et al. "Architecture for Assured Service Capabilities in Voice over IP", Internet Draft, Internet Engineering Task Force, June 2003 and Pierce, et al. "Requirements for Assured Service Capabilities in Voice over IP", Internet Draft, Internet Engineering Task Force, June 2003. The Assured Service environment provides voice calls with different levels of precedence. In the event of traffic congestion, mission critical calls will be unaffected while calls of lower level precedence may experience reduced quality.

It has been determined that Call Admission Control (CAC) procedures are also necessary to achieve the desired Assured Service capabilities. See Baker, et al., "MLEF Without Capacity Admission Does Not Satisfy MLPP Requirements," Internet Draft, Internet Engineering Task Force, February 2004. In particular, CAC ensures that, during contention within one level of priority, the system does not end up degrading the quality of service of all the calls at that priority so that no effective communication can actually happen at that priority. Rather, in case of contention, CAC can reject the excessive calls which are beyond the current system capacity to make sure that all the calls within the system capacity experience satisfactory quality of service allowing effective communication at that priority.

It has been found that the well-known RSVP protocol can be used to provide such CAC procedures in combination with certain other mechanisms to fully support the Assured Service Capabilities using EF (Expedited Forwarding) PHB (per hop behavior) in the data path. See Baker, et al. "Implementing MLPP for Voice and Video in the Internet Protocol Suite," Internet Draft, Internet Engineering Task Force, February 2004. The CAC procedures operated by the control plane avoid contention by data packets under normal (non-transient conditions). Some loss could potentially occur, however, in some special circumstances such as routing transients and variable rate beat frequencies.

Under these transient conditions a policer can be used to discard packets based on their precedence levels. The policer should not drop any packets when the traffic does not exceed the aggregate policing rate. When the traffic exceeds the aggregate policing rate, the policer should drop packets of lower priority levels to make room for packets of higher priority levels.

In other environments, it is also very common to want to enforce a division of bandwidth across arbitrary subsets of traffic (which we refer to as "traffic classes") in a hierarchical manner where the highest priority class should be able to use any fraction of the available bandwidth, then the next priority should be able to use whatever is left, and so on (possibly with some limitation at each level). It may also be desirable to assign a guaranteed rate to each "traffic class" irrespective of its priority and in addition, divide the remaining bandwidth in the order of priority, as above. A policer can be used to enforce such policies. The policer can operate to discard packets, or alternatively to remark packets to lower their precedence level.

SUMMARY OF THE INVENTION

Embodiments of the present invention provide a hierarchical multi-rate multi-precedence policer. The policer discards packets based on assigned precedence levels. When traffic exceeds an available service rate, the policer drops packets of lower precedence levels to make room for packets of higher precedence levels. In certain implementations, the policer also guarantees bandwidth to each level, thus preventing complete loss of lower precedence traffic when there is a large amount of higher precedence traffic.

A first aspect of the present invention provides a method for operating a multi-rate multi-precedence policer. The method includes: providing a plurality of packet precedence levels, providing a traffic meter for each of the packet precedence levels, and determining a policer operation for a received packet based on the traffic meter associated with the received packet's precedence level. The received packet affects traffic measured by the traffic meter associated with the received packet's precedence level and all traffic meters associated with precedence levels below the received packet's precedence level.

A second aspect of the present invention provides a computer program product for operating a packet policer. The computer program product includes: code that causes received traffic to be limited in accordance with rates corresponding to precedence levels to which packets of the received traffic are assigned; code that causes packets of the lowest possible precedence levels to be dropped or remarked to assure conformance to the rates; and a computer-readable medium that stores the codes.

A third aspect of the present invention provides a method of operating a network. The method includes: assigning a plurality of calls to a plurality of precedence levels such that packets belong to a call are assigned a corresponding precedence levels; and operating a policer to police traffic generated by the calls by limiting the received traffic in accordance with rates corresponding to the precedence levels and dropping or remarking packets of the lowest possible precedence levels to assure conformance to the rates.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application but is not limited to this application. In the representative application, calls such as voice or video calls are carried across a packet network such as an IP network. Calls are assigned various precedence levels. When a router of the network encounters congestion packets are discarded based on their assigned precedence levels.

Figure 1:
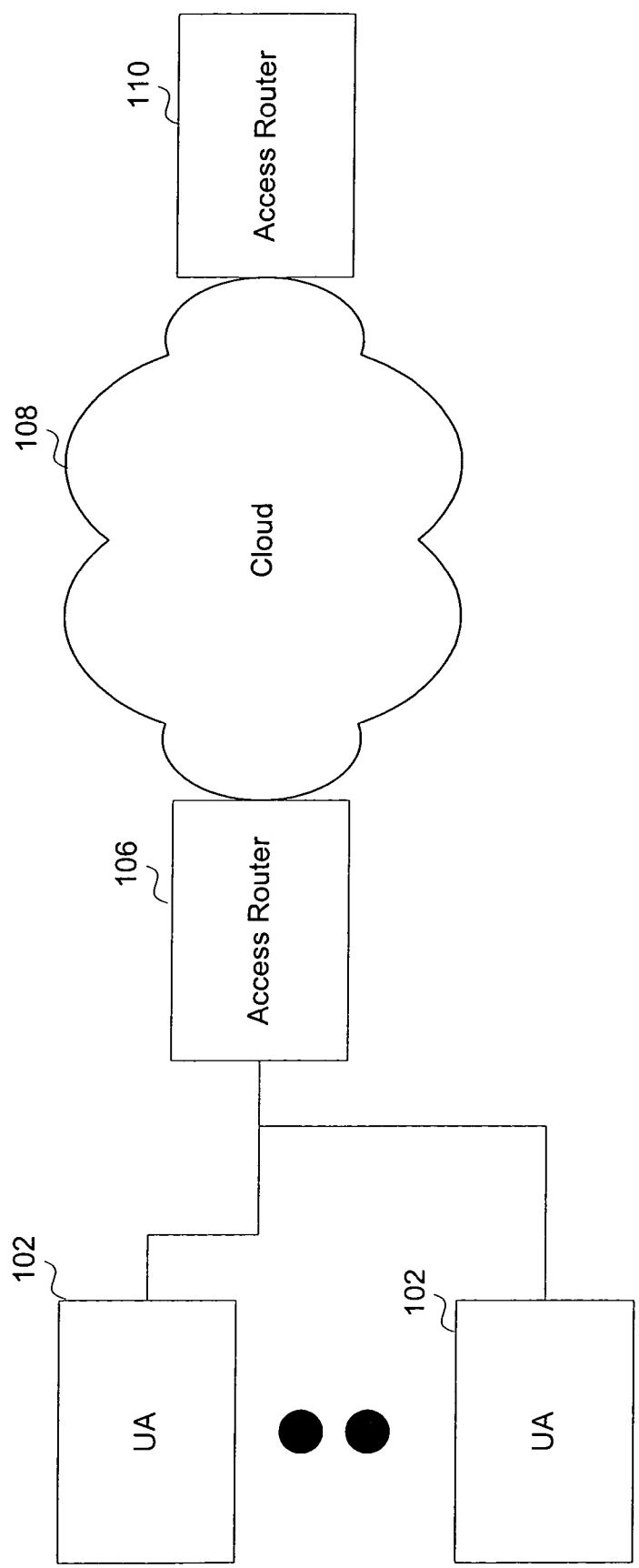
FIG. 1 depicts a network architecture to which embodiments of the present invention may be applied.

FIG. 1 depicts elements of such a network 100. Packets are originated or terminated by various user agents 102 which are devices such as telephones, video phones, computers, etc. Data traffic flows through an access router 106 into a network cloud 108 that includes further routers (not shown). On the other side of the cloud there is another access router 110, other user agents (not shown) and another proxy (also not shown).

The precedence level of each packet is determined for each packet and assigned by the user agent, possibly in conjunction with some authentication mechanism. The assigned precedence level may be inferred from information in the packet header. As a particular example, the precedence may be conveyed in the Diffserv field of the IP packet header.

Packets under considerations are scheduled in a single queue. In one embodiment of this invention this queue materializes the Expedited Forwarding Per-Hop Behavior (EF PHB) capabilities as defined in Requests for Comment 3246 and 3247. In another embodiment, there is no specific scheduling other than simple FIFO queueing of packets onto the link.

A service rate is available collectively to the traffic under consideration. Call admission procedures may be used to assure that this service rate is not exceeded by the aggregate rate of the traffic. However, there may be congestion where admission control is not used, or where admission control is used but certain transient conditions cause the service rate to be exceeded. To enforce the relative priority in access to bandwidth across precedences, packets from the lower precedence may be dropped to allow higher precedence packets to flow.

Embodiments of the present invention provide a hierarchical multi-rate multi-precedence policer (HMMP) that operates to keep or drop packets in the desired fashion. Such an HMMP can operate in the access router 106 before packets are subject to EF PHB. HMMP may also operate in any router where congestion could be encountered. Also, the HMMP scheme described here is not limited to Assured Service networks but may be applied wherever suitable.

Figure 2:
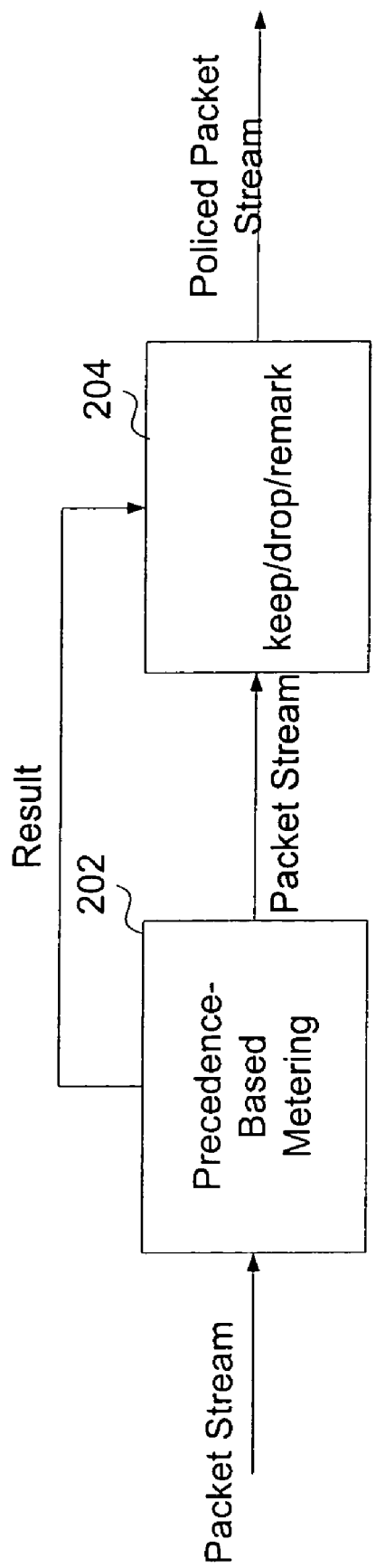
FIG. 2 depicts the structure of policing according to one embodiment of the present invention.

HMMP is preferably a traffic conditioner behaving as a policer (i.e., for every received packet it makes a decision to accept, drop, or remark that packet). HMMP may be run before packets are handed over to the EF PHB or any other mechanisms for scheduling and/or transmission of the packets. As shown in FIG. 2, the HMMP decision to keep or drop a packet depends on the packet precedence level. This precedence level can be inferred by the router, for example by taking into account information in the packet header such as the DSCP (Differentiated Services Codepoint) value included in the Diffserv field. In certain implementations, the main objectives of HMMP are:

when the aggregate received traffic across all precedence levels does not exceed the aggregate service rate available for all this traffic, to not drop any packets when the aggregate received traffic across all precedence levels exceeds the aggregate service rate available for all this traffic, to drop or remark packets of the lower precedence levels in order to make room for packets of higher precedence.

There are several assumptions made in the above discussions. First is that all traffic, regardless of precedence level, shares a single queue. Second, that there is a maximum rate to which the entire traffic aggregate must be policed for proper operations to e.g., prevent QoS degradation, prevent exhaustion of limited interface bandwidth, satisfy administrative constraints, etc. This rate may be explicitly configured to below the rate of the output interface or could also just be the rate of the interface.

HMMP submits a received packet to a per-precedence meter 202 and the corresponding result is then used by a keep/drop/remark block 204 to keep, drop, or remark the packet.

Two modes for HMMP will now be described: a nested mode and a parallel mode.

Conceptually, the two models differ by the assumptions on rate constraints for various precedence levels. The nested mode assumes nested rate limits, i.e., that the highest precedence level must be limited to some rate R(n), the highest and the next highest precedence level together must be limited by some rate $R(n-1) \geq R(n)$, etc.

By contrast, the parallel mode assumes that each precedence level may be independently limited to its own rate (although all of them combined may be limited to a rate less than the sum of individual rates).

In the simplest configuration of HMMP, each precedence level is only limited by the same rate R, and all precedence levels together are also limited to the same rate R. Note that this case can be represented by either the parallel or the nested mode.

A key aspect of both models of HMMP is that a packet of a given precedence effectively uses credit not only in the meter for that precedence, but also in all the meters for the precedence levels below (i.e., in the nested mode a packet belonging to a call of a given precedence explicitly uses credit for all the priorities below, while in the parallel mode active higher precedence levels are allocated credit with priority over the lower precedence levels). In turn, this results in lower priorities getting dropped when credits are used by higher priorities.

Details of the HMMP configuration and of the per-precedence metering operations for both modes are provided below. For each of the modes, two example specifications of HMMP stemming from two common description of token buckets—an "interval-based" and an "arrival-based" specification—are described. HMMP implementation need not follow these specifications. A further specification is provided for an HMMP variant where precedence levels are also provided minimum guaranteed rates.

Nested HMMP

Nested HMMP is configured by selecting values for:

"n": the number of precedence levels

"NesR(i)": the maximum allowed rate of traffic aggregated over all the precedence levels above and including precedence level i (expressed in number of bytes per second).

Note: if p<q for some precedence levels p and q, then NesR(p)>NesR(q).

"NesB(i)": the depth of the token bucket (in bytes) corresponding to all precedence levels $p \leq i$.

Note: if $p > q$, $NesB(q) \leq NesB(p)$

The following two subsections respectively provide an interval-based and an arrival-based description of the operation of nested HMMP.

Interval-Based Nested HMMP

The behavior of the Nested HMMP is specified in terms of N nested token buckets referred to as Bi, with $1 \leq i \leq n$, each with rate NesR(i) and depth NesB(i).

Define:

INT is the update interval in seconds.

T(i) is the token counter for token bucket Bi.

DEF(i)=NesB(i)−T(i) is the number of tokens missing in bucket Bi to fill the bucket.

MaxT(i)=NesR(i)×INT is the maximum number of tokens added to a token bucket of rate NesR(i) in the interval INT.

INC(i)=Min [MaxT(i), DEF(i)]

Figure 3:
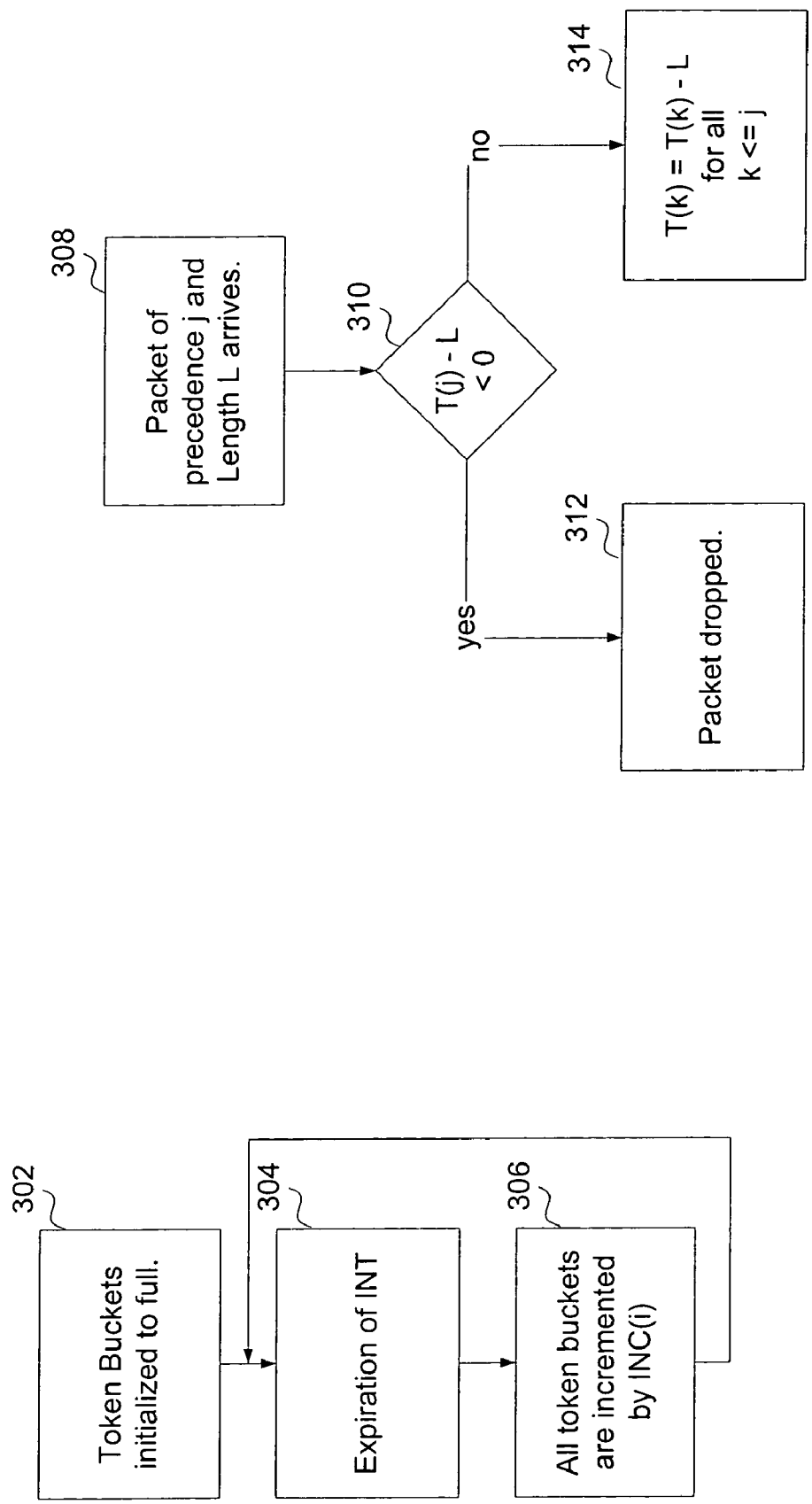
FIGS. 3A-3B are flowcharts describing steps of operating an interval-based nested hierarchical multi-rate multi-precedence policer (HMMP) according to one embodiment of the present invention.

FIG. 3A is a flowchart describing steps of operating the token buckets.

Initially all the token buckets are set to full at step 302, i.e. all the token counters T(i)=NesB(i), for $1 \leq i \leq n$.

Upon every expiration of "INT" time interval at step 304, all the token counts T(i) are incremented by INC(i) at step 306.

FIG. 3B is a flowchart describing steps of handling a received packet. When a packet of precedence j and of length L bytes arrives at step 308, the quantity T(j)−L>0 is compared to zero at step 310.

if T(j)−L<0, then the packet is dropped (step 312), else T(k)=T(k)−L for all $k \leq j$ (step 314)

(Note that T(k) can go negative for some k<j).

Arrival-Based Nested HMMP

Define:

LastTime—the time of last change of the state of HMMP.

CurrentTime—current real time.

DeltaTime—the difference between CurrentTime and LastTime.

MaxT(i)=NesR(i)×DeltaTime=the maximum number of tokens that may be added to a token bucket of rate NesR(i) in the interval DeltaTime.

T(i), DEF(i), and INC(i) are defined as they are for the interval-based nested HMMP specification.

Initially all the token buckets are full, i.e., all the token counters T(i)=NesB(i), for $1 \leq i \leq n$. The variable "LastTime" is set to the real time at initialization.

Figure 4:
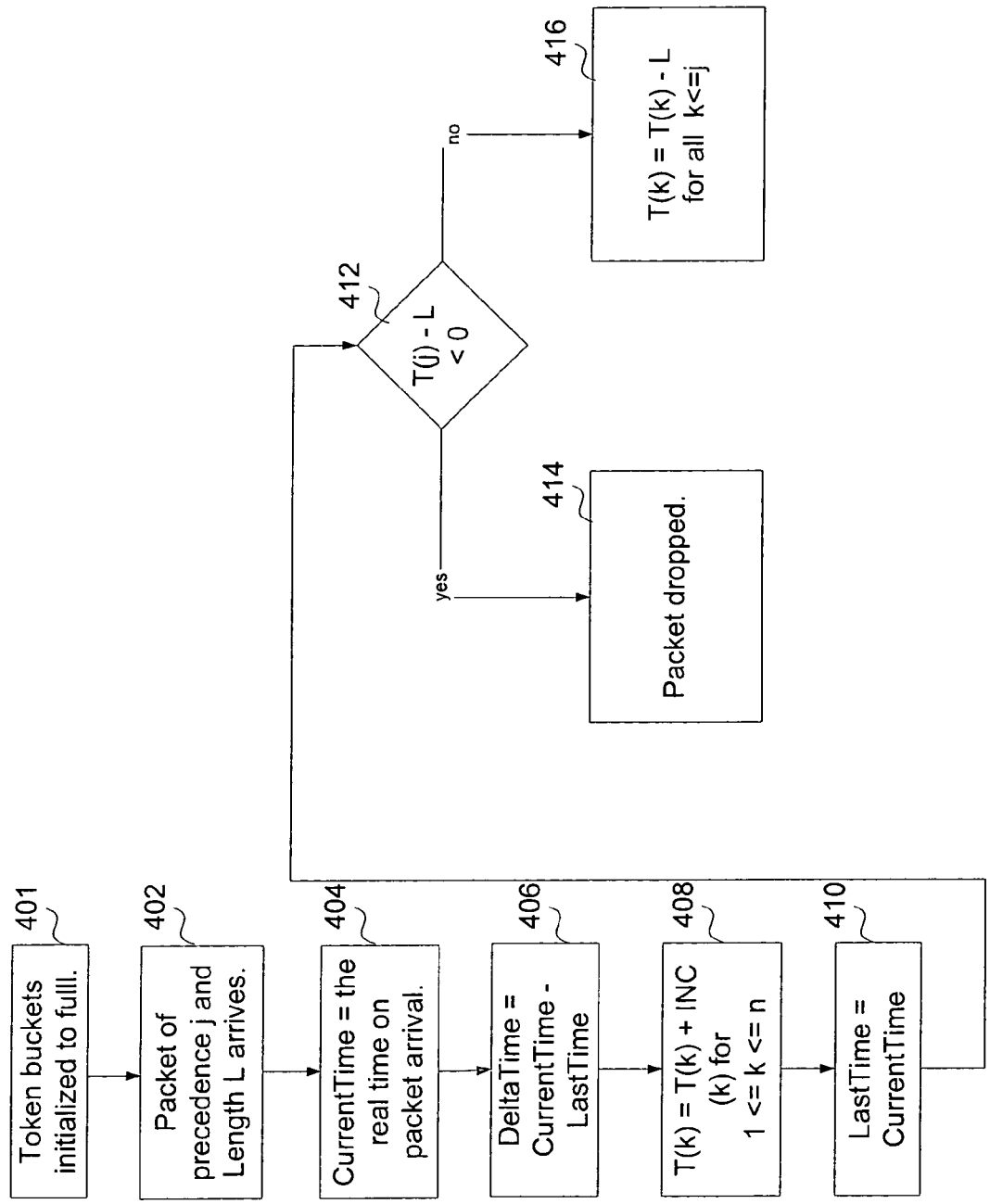
FIG. 4 is a flowchart describing steps of operating an arrival-based nested HMMP according to one embodiment of the present invention.

FIG. 4 is a flowchart describing steps of handling a received packet. When a packet of precedence j and of length L bytes arrives at step 402, the following occurs:

CurrentTime=the real time on packet arrival (step 404)

DeltaTime=CurrentTime−LastTime (step 406)

T(k)=T(k)+INC(k) for $1 \leq k \leq n$ (step 408)

LastTime=CurrentTime (step 410)

T(j)−L is compared to 0 (step 412)

if T(j)−L<0, then packet is dropped, (step 414)

else T(k)=T(k)−L for all $k \leq j$ (step 416)

(Note that T(k) can go negative for some k<j).

Nested HMMP Example 1

Using the interval-based specification, assume Nested HMMP is configured with:

n=3 precedence levels

INT=1 second

NesR(3)=NesR(2)=NesR(1)=3 L (i.e. 3 packet sizes) per second

NesB(3)=NesB(2)=NesB(1)=3 L (i.e. 3 packet sizes)

(All packets are assumed to be of identical size L for simplicity)

Assume the actual load comes from four voice calls:

1 call at precedence 3, 1 call at precedence 2, 2 calls at precedence 1 and that packets of each call are received back to back in the order of descending precedence every second.

Initially T(3)=T(2)=T(1)=3 L we receive a packet at 3, then T(3)=2 L, T(2)=2 L, T(1)=2 L we receive a packet at 2, then T(3)=2 L, T(2)=1 L, T(1)=1 L we receive a packet at 1, then T(3)=2 L, T(2)=1 L, T(1)=0 we receive a packet at 1, then the packet is dropped and T(3)=2 L, T(2)=1 L, T(1)=0

After 1 second:

INC(3)=Min(3 L,3 L−2 L)=1 L, INC(2)=Min(3 L,3 L−1 L)=2 L,

INC(1)=Min(3 L,3 L−0)=3 L

Tokens would have been increased to T(3)=2 L+1 L=3 L, T(2)=1 L+2 L=3 L, T(1)=0+3 L=3 L The pattern then repeats every second. In this example, it is seen that nested HMMP only accepts a total of three packets per interval, always drops one of the two low precedence packets, and never drops packets of precedence 2 or 3.

Nested HMMP Example 2

Using the interval-based specification, assume nested HMMP is configured with:

n=3 precedence levels

NesR(3)=NesR(2)=NesR(1)=3 L i.e. 3 packet sizes (per second)

NesB(3)=NesB(2)=NesB(1)=3 L i.e. 3 packet sizes (All packets are assumed to be of identical size L for simplicity.)

Assume the actual load comes from four voice calls:

1 call at precedence 3, 1 call at precedence 2, 2 calls at precedence 1, and that packets of each call are received back to back, but this time, in the order of ascending priority.

Initially T(3)=T(2)=T(1)=3 L we receive a packet at precedence 1, then T(3)=3 L, T(2)=3 L, T(1)=2 L we receive a packet at precedence 1, then T(3)=3 L, T(2)=3 L, T(1)=1 L we receive a packet at precedence 2, then T(3)=3 L, T(2)=2 L, T(1)=0 we receive a packet at precedence 3, then T(3)=2 L, T(2)=1 L, T(1)=−1 L

After 1 second:

Token buckets have increased to T(3)=2+1=3, T(2)=1+2=3, T(1)=−1+3=2 we receive a packet at precedence 1, then T(3)=3, T(2)=3, T(1)=1 we receive a packet at precedence 1, then T(3)=3, T(2)=3, T(1)=0 we receive a packet at precedence 2, then T(3)=3, T(2)=2, T(1)=−1 we receive a packet at precedence 3, then T(3)=2, T(2)=1, T(1)=−2

After 2 seconds:

Token bucket counts have increased to T(3)=2+1=3, T(2)=1+2=3, T(1)=−2+3=1 we receive a packet at precedence 1, then T(3)=3, T(2)=3, T(1)=0 we receive a packet at precedence 1, then packet is dropped and T(3)=3, T(2)=3, T(1)=0 we receive a packet at precedence 2, then T(3)=3, T(2)=2, T(1)=−1 we receive a packet at precedence 3, then T(3)=2, T(2)=1, T(1)=−2

After three seconds:

Token bucket counts have increased to T(3)=2+1=3, T(2)=1+2=3, T(1)=−2+3=1

Thereafter, the pattern repeats every second. In this example, it is seen that over the two first seconds, nested HMMP accepts the four packets received. In any subsequent interval, nested HMMP only accepts a total of three packets per period, always drops one of the two precedence 1 packets, and never drops packets of precedence 2 or 3.

Parallel HMMP

Parallel HMMP can be specified in many ways. An "interval-based" specification, and an "arrival-based" specification are provided as representative examples.

The behavior of parallel HMMP is specified in terms of N independent token buckets referred to as Bi, with 1<=i<=n.

The Parallel HMMP is configured by selecting values for:

"n": the number of precedence levels

"R(i)": the maximum allowed rate of traffic for precedence level i (expressed in bytes per second).

"R": the maximum allowed aggregate rate across all the precedence levels (expressed in bytes per second). Note that R may be equal to, or smaller than, the sum of all R(i). In the Assured Service context, R is preferably configured to reflect the maximum rate that the EF PHB can service without quality of service degradation.

B(i): the depth of the token bucket B(i) (in bytes) for precedence level i.

Interval-Based Parallel HMMP

Define:

INT is the update Interval in seconds.

T(i) is the token counter for token bucket Bi.

RemT is a variable which keeps track of the remaining tokens to be allocated across all the precedences in the current interval.

DEF(i) is the number of tokens missing in bucket Bi to fill the bucket.

MaxT(i) is R(i)×INT, the maximum number of tokens added to a token bucket of rate R(i) in interval INT.

INC(i) is the number of tokens actually added to bucket Bi at a given round.

Figure 5:
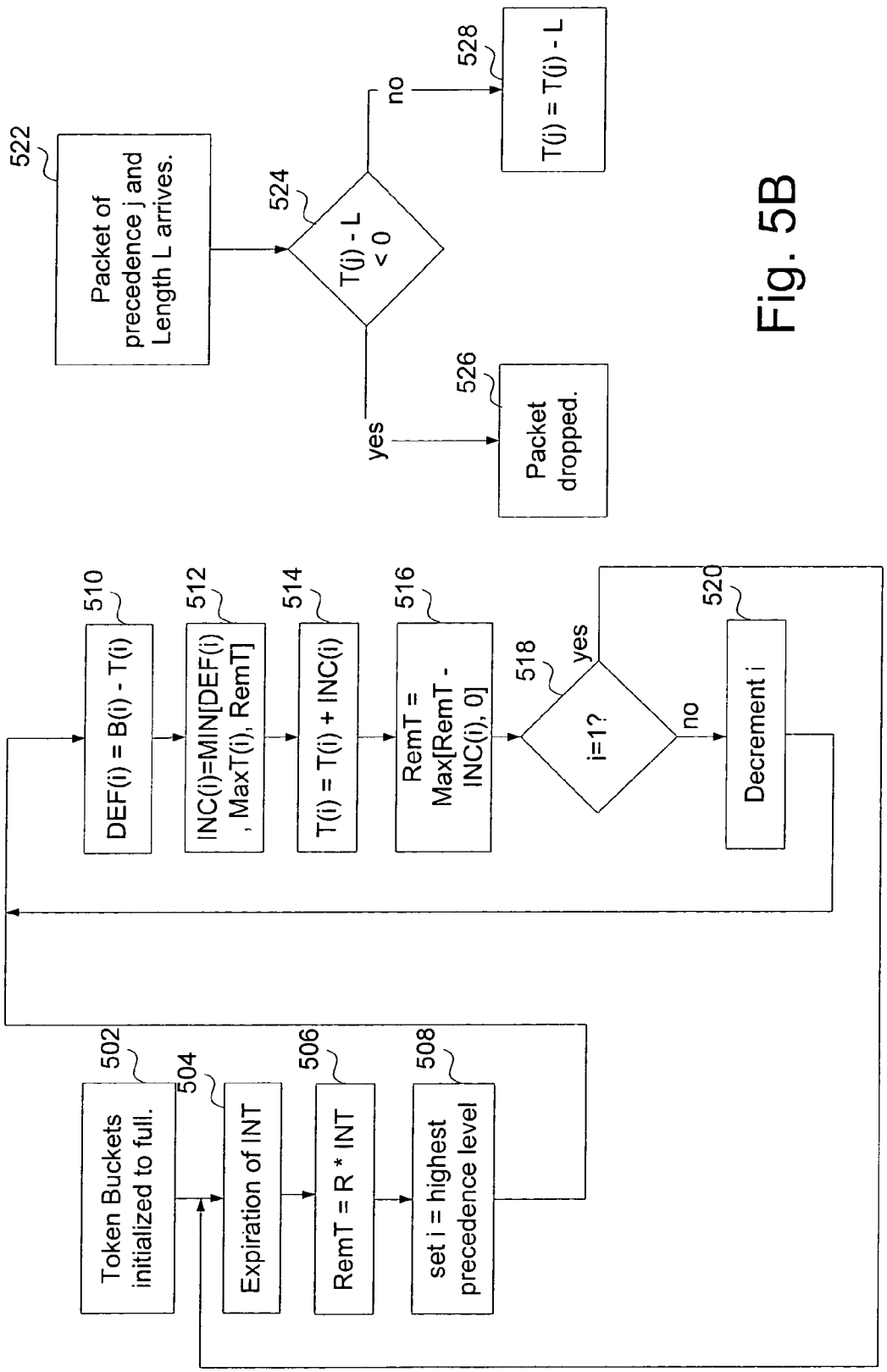
FIGS. 5A-5B are flowcharts describing steps of operating an interval-based parallel HMMP according to one embodiment of the present invention.

FIG. 5A is a flowchart describing steps of periodically updating the token buckets. All the token buckets are initialized to be full at step 502, i.e. all the token counters T(i)=B(i), for 1<=i<=n.

Upon expiration of the "INT" time interval at step 504, all the token counters T(i) are incremented in the following manner:

RemT is initialized to RemT=R×INT (step 506)

for each token bucket i, starting from the highest precedence, and going down to lowest precedence: (loop initialized at step 508)

DEF(i)=B(i)−T(i) (step 510)

INC(i)=Min [DEF(i), MaxT(i), RemT] (step 512)

T(i)=T(i)+INC(i) (step 514)

RemT=Max [RemT−INC(i), 0] (step 516)

Step 518 tests whether all the token buckets have been updated and step 520 decrements the token bucket index.

FIG. 5B describes handling of a received packet. When a packet of precedence level j and of length L bytes arrives at step 522, T(j)−L is compared to 0 at step 524.

if T(j)−L<0, the packet is dropped (step 526), else T(j)=T(j)−L (step 528)

Arrival-Based Parallel HMMP

Define:

LastTime is the time of last change of the state of HMMP.

CurrentTime is current real time.

DeltaTime is the difference between CurrentTime and LastTime.

MaxT(i)=R(i)*DeltaTime, the maximum number of tokens that may be added to bucket Bi in the interval DeltaTime.

T(i), DEF(i), INC(i) and RemT are defined as in the interval-based parallel HMMP.

Initially all the token buckets are full, i.e., all the token counters T(i)=B(i), for 1<=i<=n. The variable LastTime is set to the real time at initialization.

Figure 6:
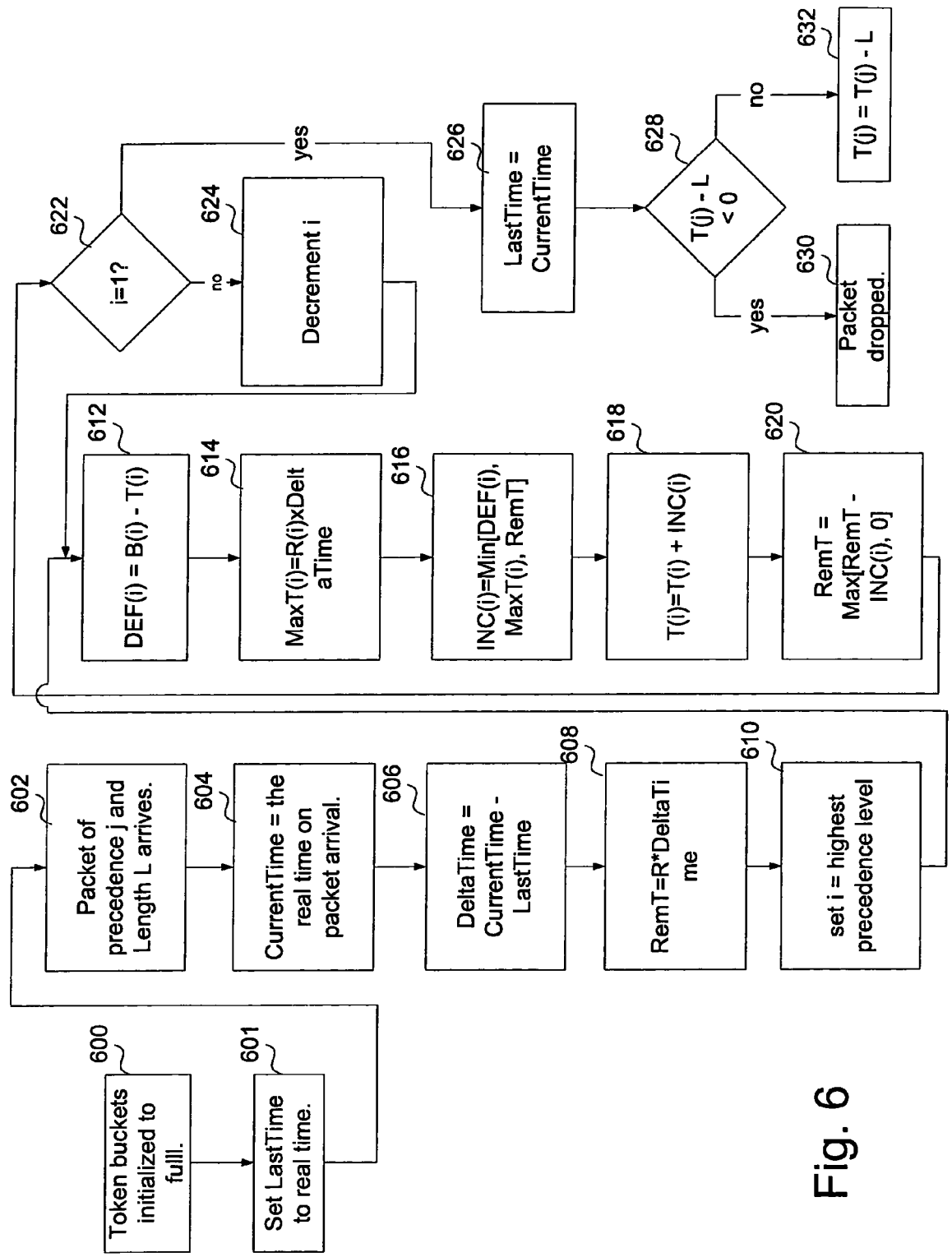
FIG. 6 is a flowchart describing steps of operating an arrival-based parallel HMMP according to one embodiment of the present invention.

FIG. 6 shows how a received packet is handled. At step 602, a packet of precedence j and of length L bytes arrives. This results in the following steps:

CurrentTime=the real time of packet arrival (step 604)

DeltaTime=CurrentTime−LastTime (step 606)

RemT=R×DeltaTime (step 608)

for each token bucket i, starting from highest precedence level, and going down to the lowest precedence: (loop initialized at step 610)

DEF(i)=B(i)−T(i) (tokens needed to fill the bucket) (step 612)

MaxT(i)=R(i)×DeltaTime(tokens due to this bucket since last packet arrival) (step 614)

INC(i)=Min [DEF(i), MaxT(i), RemT] (step 616)

T(i)=T(i)+INC(i) (step 618)

RemT=Max [RemT−INC(i), 0] (step 620)

Step 622 tests whether all the token buckets have been updated and step 624 decrements the token bucket index. After all the token buckets have been updated, LastTime=CurrentTime (step 626)

T(j)−L is compared to 0 (step 628)

if T(j)−L<0, then packet is dropped, (step 630)

else T(j)=T(j)−L (step 632)

Working Parallel HMMP Example 1

Using the interval-based specification, assume Parallel HMMP is configured with:

n=3 precedence levels

INT=1 second

R(3)=R(2)=R(1)=R=3 L i.e. 3 packet sizes per second

B(3)=B(2)=B(1)=3 L i.e. 3 packet sizes (Assume all packets are of identical size L for simplicity)

Assume the actual load comes from four voice calls:

1 call at precedence 3, 1 call at precedence 2, 2 calls at precedence 1 and that packets of each call are received back to back in order of descending precedence every second.

Initially T(3)=T(2)=T(1)=3 L we receive a packet at precedence 3, then T(3)=2 L, T(2)=3 L, T(1)=3 L we receive a packet at precedence 2, then T(3)=2 L, T(2)=2 L, T(1)=3 L we receive a packet at precedence 1, then T(3)=2 L, T(2)=2 L, T(1)=2 L we receive a packet at precedence 1, then T(3)=2 L, T(2)=2 L, T(1)=1 L After 1 second:

INC(3)=Min(1 L,3 L,3 L)=1 L, INC(2)=Min(1 L,3 L,3 L−1 L)=1 L, INC(1)=Min(2 L,3 L,3 L−1 L−1 L)=1 L

Token counters increase to T(3)=2 L+1 L=3 L, T(2)=1 L+2 L=3 L, T(1)=1 L+1 L=2 L
  we receive a packet at precedence 3, then T(3)=2 L, T(2)=3 L, T(1)=2 L
  we receive a packet at precedence 2, then T(3)=2 L, T(2)=2 L, T(1)=2 L
  we receive a packet at precedence 1, then T(3)=2 L, T(2)=2 L, T(1)=1 L
  we receive a packet at precedence 1, then T(3)=2 L, T(2)=2 L, T(1)=0 L
  After 1 second:
  INC(3)=Min(1 L,3 L,3 L)=1 L, INC(2)=Min(1 L,3 L,3 L−1 L)=1 L, INC(1)=Min(3 L,3 L,3 L−1 L−1 L)=1 L
  Token counters have thus increased to T(3)=2 L+1 L=3 L, T(2)=1 L+2 L=3 L, T(1)=0 L+1 L=1 L
  we receive a packet at precedence 3, then T(3)=2 L, T(2)=3 L, T(1)=1 L
  we receive a packet at precedence 2, then T(3)=2 L, T(2)=2 L, T(1)=1 L
  we receive a packet at precedence 1, then T(3)=2 L, T(2)=2 L, T(1)=0 L
  we receive a packet at precedence 1, then that packet is dropped
  After 1 second:
  INC(3)=Min(1 L,3 L,3 L)=1 L, INC(2)=Min(1 L,3 L,3 L−1 L)=1 L, INC(1)=Min(3 L,3 L,3 L−1 L−1 L)=1 L
  Token counters would have thus increased to T(3)=2 L+1 L=3 L, T(2)=1 L+2 L=3 L, T(1)=0 L+1 L=1 L
  The same pattern will then repeat every second.

It is seen in this example that during the first two seconds, parallel HMMP accepts the four packets received. In any subsequent interval, parallel HMMP only accepts a total of three packets per period, always drops one of the two precedence 1 packets, and never drops packets of precedence levels 2 or 3.

Working Parallel HMMP Example 2

Using the interval-based specification, assume Parallel HMMP is configured with:
  n=3 precedence levels
  INT=1 second
  R(3)=R(2)=R(1)=R=3 L i.e., 3 packet sizes per second
  B(3)=B(2)=B(1)=3 L i.e., 3 packet sizes
  (All packets are assumed to have identical size L for simplicity.)
  Assume the actual load comes from four voice calls:
  1 call at precedence 3,
  1 call at precedence 2, and
  2 calls at precedence 1.
Further assume that packets of each call are received back to back, but, for this example, in order of ascending priority.

The same pattern shown in the previous example will arise. Over the two first seconds, parallel HMMP accepts the four packets received. In the subsequent intervals, parallel HMMP only accepts a total of three packets per period, always drops one of the two precedence 1 packets, and never drops packets of precedence 2 or 3.

Arrival-Based Parallel HMMP with Guaranteed Rates for Precedence Levels

The above variants of HMMP allow a given precedence level to use up all the credit left over by higher precedence levels. Other variants of HMMP enforce different policies for controlling how remaining credit is to be shared between a given precedence level and the levels below it. A particular example of this type of HMMP implementation is a parallel HMMP with guaranteed rates for precedence levels.

In this HMMP variant, each precedence level is configured with two rates, a maximum rate R(i) and a "guaranteed" rate r(i). Each precedence level should receive at least r(i) if needed but never more than R(i). The highest precedence level has rights to all necessary bandwidth up to R(i). The next highest priority then can use any remaining allocation to get anything it needs beyond its own r(i) up to its R(i) and so on.

Figure 7A:
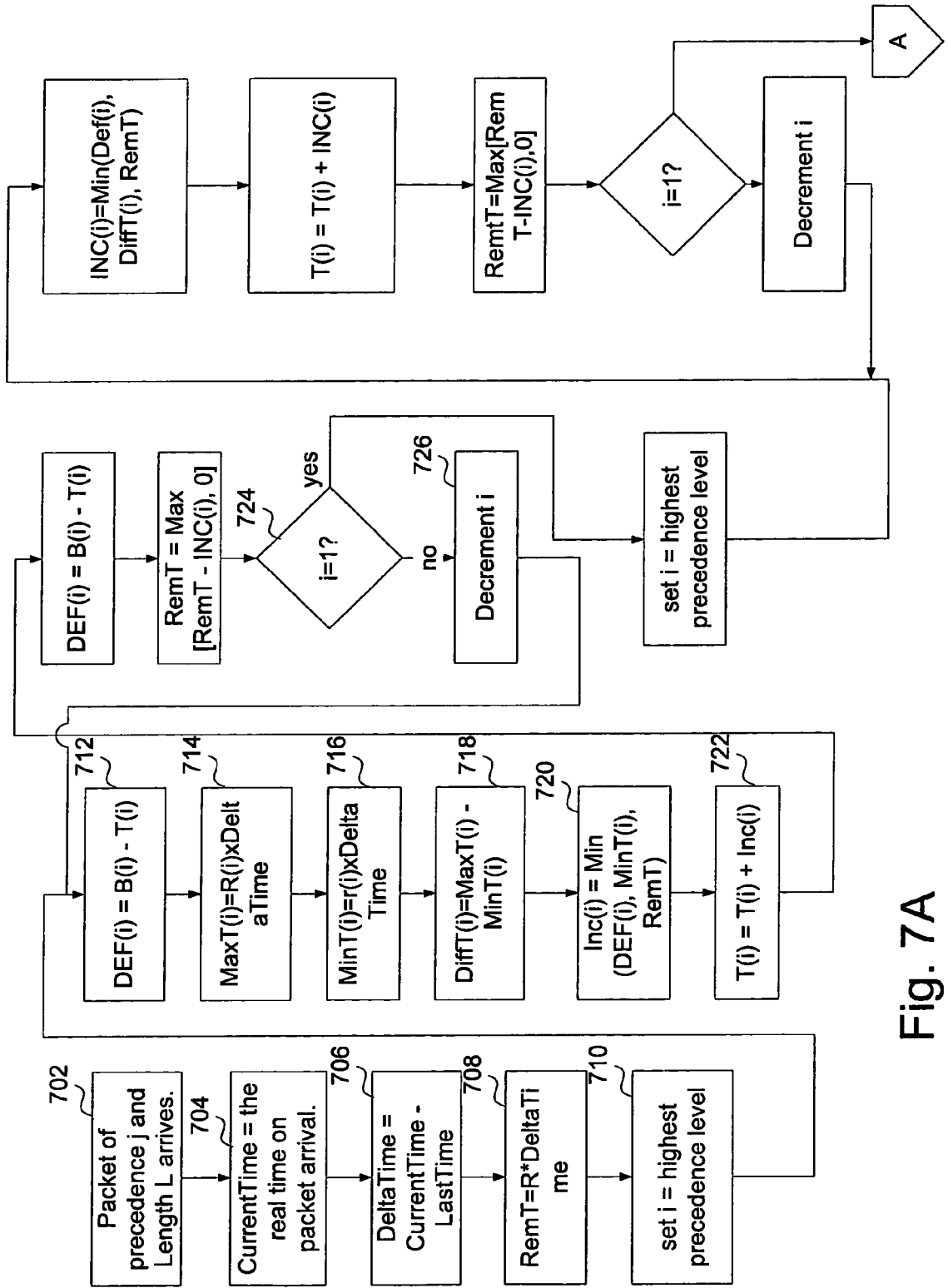
FIG. 7A-7B together depict a flowchart describing steps of operating an arrival-based parallel HMMP with guaranteed rates for precedence levels according to one embodiment of the present invention.
Figure 7B:
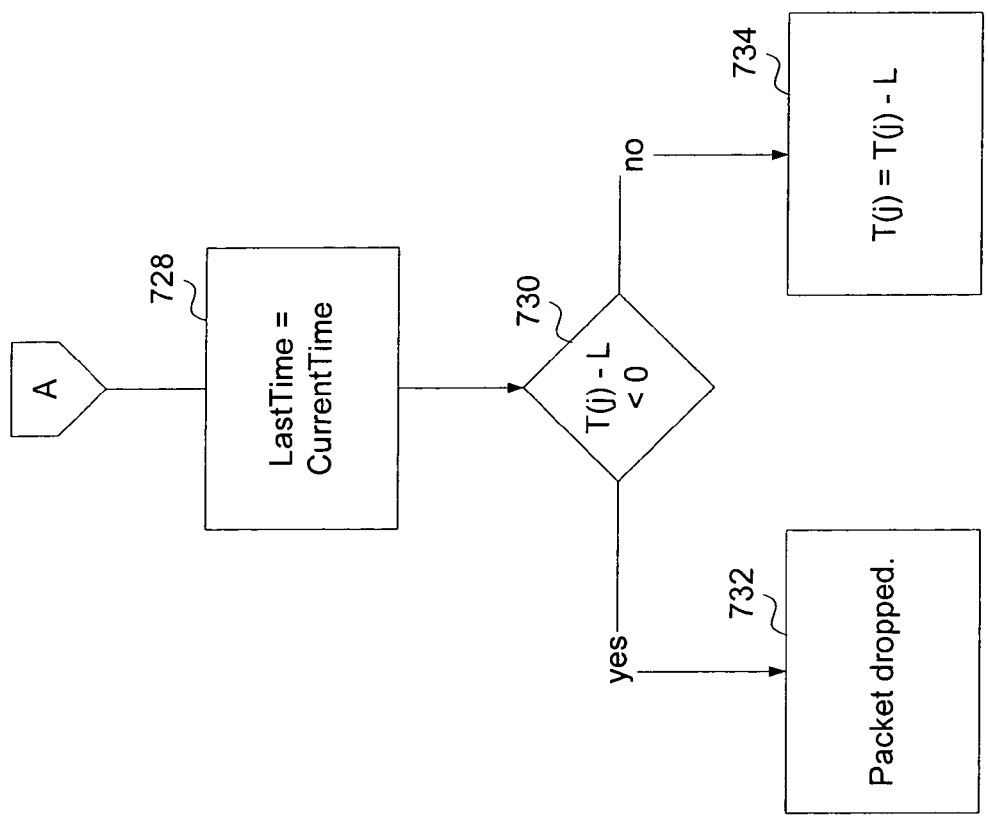

FIG. 7A-7B together depict a flowchart describing steps of handling a received packet in this scheme. Expressions not defined in the FIG. 7 discussion have the same meaning as in the FIG. 6 discussion. In FIG. 7A, at step 702, a packet of precedence j and length L bytes arrives resulting in the following sequence:
  CurrentTime=real time of packet arrival (step 704)
  DeltaTime=CurrentTime−LastTime (step 706)
  RemT=R×DeltaTime (step 708)
  for each token bucket i, starting from highest precedence level, and going down to the lowest precedence (loop initialized at step 710):
    DEF(i)=B(i)−T(i) (tokens needed to fill the bucket) (step 712)
    MaxT(i)=R(i)×DeltaTime(max tokens due to this bucket since last packet arrival) (step 714)
    MinT(i)=r(i)×DeltaTime(min tokens due to this bucket since last packet arrival) (step 716)
    DiffT(i)=MaxT(i)−MinT(i) (step 718)
    Inc(i)=Min (DEF(i), MinT(i), RemT) (step 720)
    T(i)=T(i)+Inc(i) (step 722)
    DEF(i)=B(i)−T(i) (step 724)
    RemT=Max [RemT−INC(i), 0] (step 726)
  Step 728 tests whether all the token buckets have been updated in this first pass and step 730 decrements the token bucket index. After all the token buckets have been updated once,
  for each token bucket i, starting from highest precedence level, and going down to the lowest precedence (loop initialized at step 732):
    INC(i)=Min (DEF(i), DiffT(i), RemT) (step 734)
    T(i)=T(i)+INC(i) (step 736)
    RemT=Max [RemT−INC(i), 0] (step 738)
  Step 740 tests whether all the token buckets have been updated in this second pass and step 742 decrements the token bucket index. After all the token buckets have been updated twice processing continues with the steps of FIG. 7B,
  LastTime=CurrentTime (step 744)
  T(j)−L is compared to 0 (step 746)
  if T(j)−L<0, then packet is dropped, (step 748)
  else T(j)=T(j)−L (step 750)

Interval-Based Parallel HMMP with Guaranteed Rates for Precedence Levels

Figure 8A:
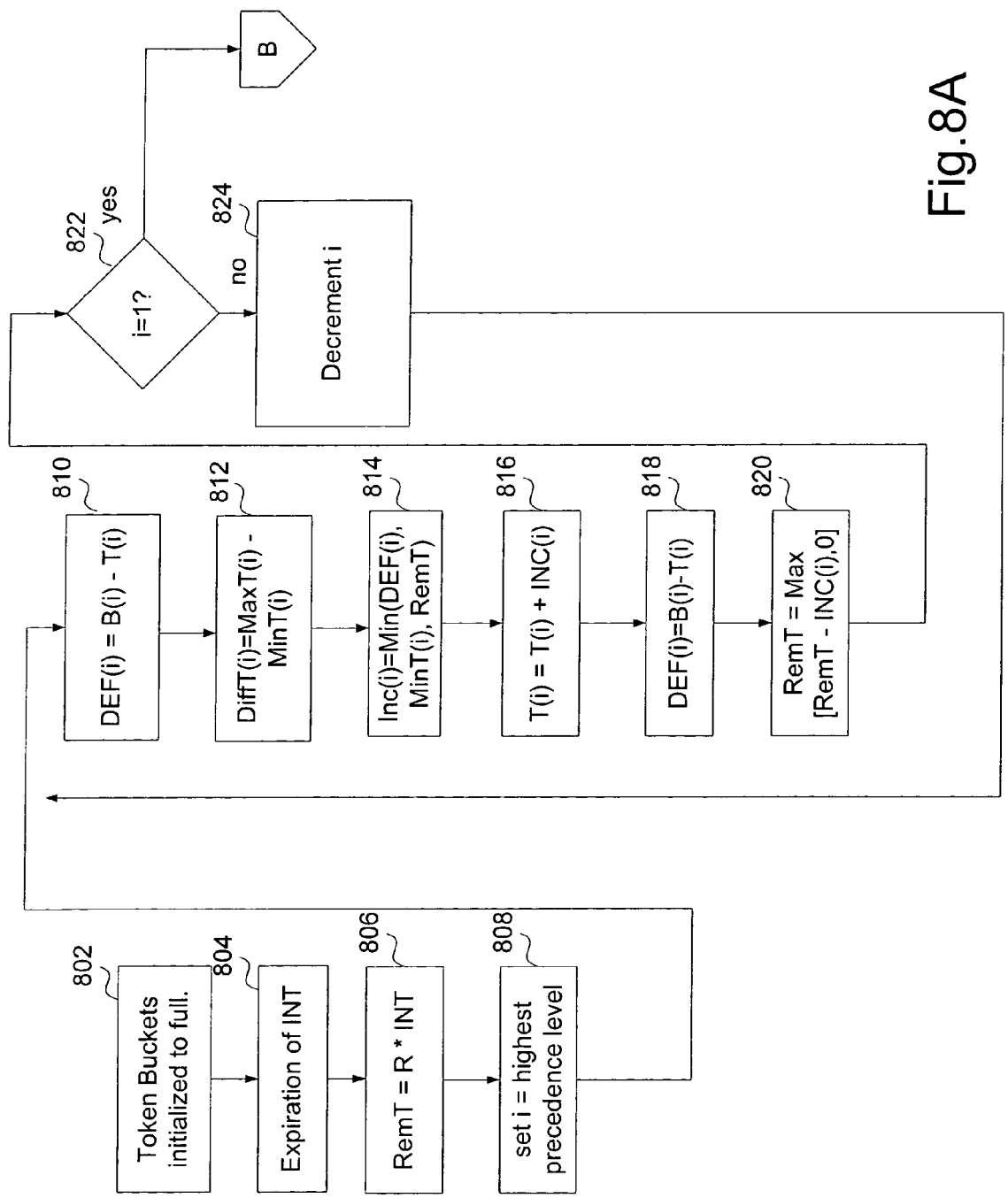
FIGS. 8A-8B together depict a flowchart describing steps of operating an interval-based parallel HMMP with guaranteed rates for precedence levels according to one embodiment of the present invention.
Figure 8B:
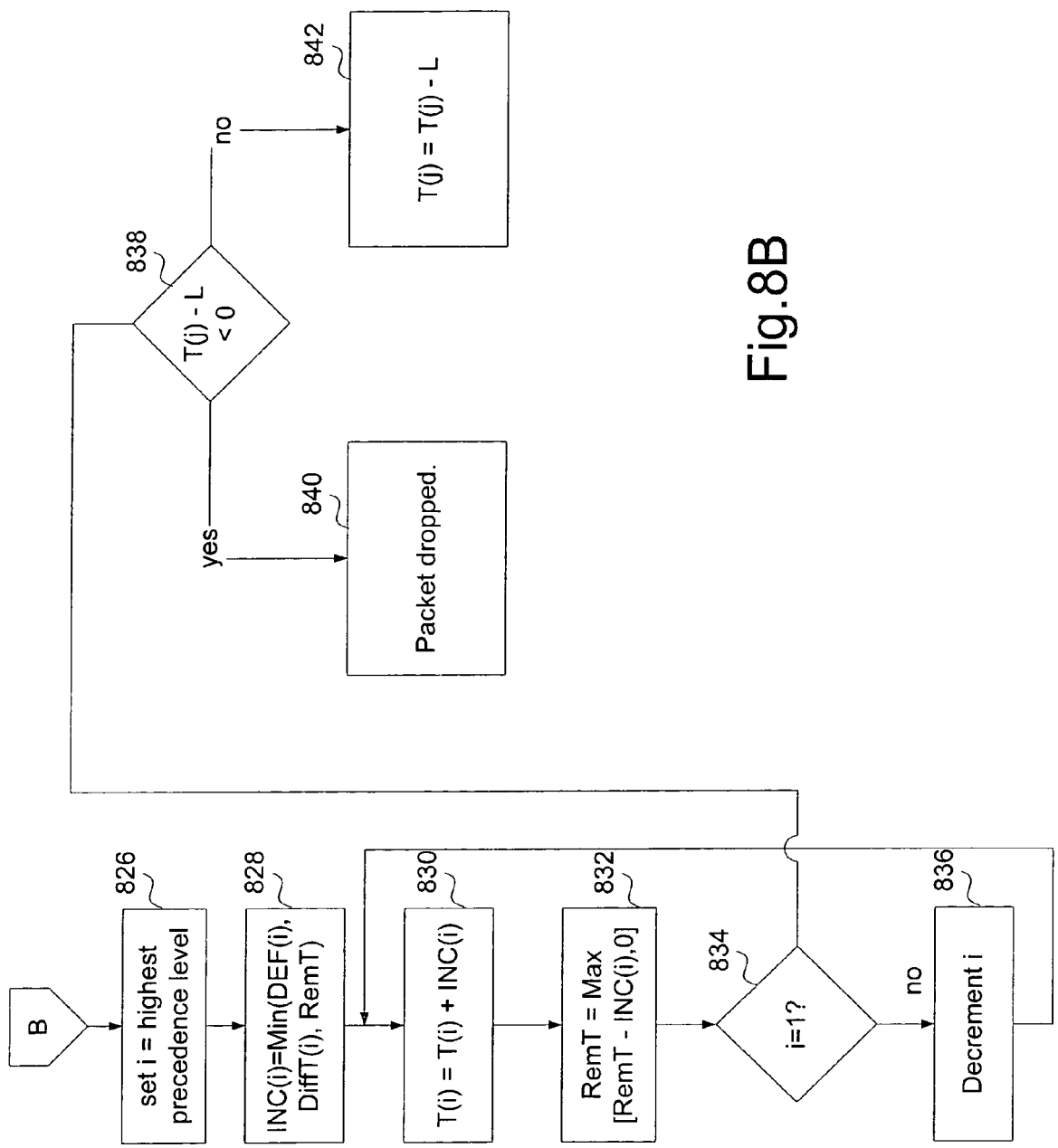

FIGS. 8A-8B together depict a flowchart describing steps of operating an interval-based parallel HMMP with guaranteed rates for precedence levels according to one embodiment of the present invention.
  Define:
    INT is the update interval in seconds
    T(i) is the token counter for token bucket Bi
    RemT is a variable which keeps track of the remaining tokens to be allocated across all the precedences in the current interval.
    DEF(i) is the number of tokens missing in bucket Bi to fill the bucket.
    MaxT(i) is R(i)×INT, the maximum number of tokens added to a token bucket of rate R(i) in interval INT.
    MinT(i) is r(i)×INT, the tokens added to a token bucket of guaranteed rate r(i) in interval INT.

INC(i) is the number of tokens actually added to bucket Bi at a given round.

FIG. 8A is a flowchart describing steps of periodically updating the token buckets. All of the token buckets are initialized to be full at step 802, i.e., all the token counters T(i)=B(i), for 1<=i<=n. Upon expiration of the "INT" time interval at step 804, all the token counters T(i) are incremented in the following manner:

RemT is initialized to RemT=R×INT (step 806) for each token bucket i, starting from highest precedence level, and going down to the lowest precedence (loop initialized at step 808):
DEF(i)=B(i)−T(i) (step 810)
DiffT(i)=MaxT(i)−MinT(i) (step 812)
Inc(i)=Min (DEF(i), MinT(i), RemT) (step 814)
T(i)=T(i)+Inc(i) (step 816)
DEF(i)=B(i)−T(i) (step 818)
RemT=Max [RemT−INC(i), 0] (step 820)

Step 822 tests whether all the token buckets have been updated in this first pass and step 824 decrements the token bucket index. After all the token buckets have been updated once, for each token bucket i, starting from highest precedence level, and going down to the lowest precedence (loop initialized at step 826):
INC(i)=Min (DEF(i), DiffT(i), RemT) (step 828)
T(i)=T(i)+INC(i) (step 830)
RemT=Max [RemT−INC(i), 0] (step 832)

Step 834 tests whether all the token buckets have been updated in the second pass and step 836 decrements the token bucket index. After all the token buckets have been updated twice, T(j)−L is compared to 0 (step 838)
if T(j)−L<0, then packet is dropped, (step 840)
else T(j)=T(j)−L (step 842)

It should be noted that the present invention also contemplates nested HMMP with guaranteed rates for precedence levels.

Network Device

Figure 9:
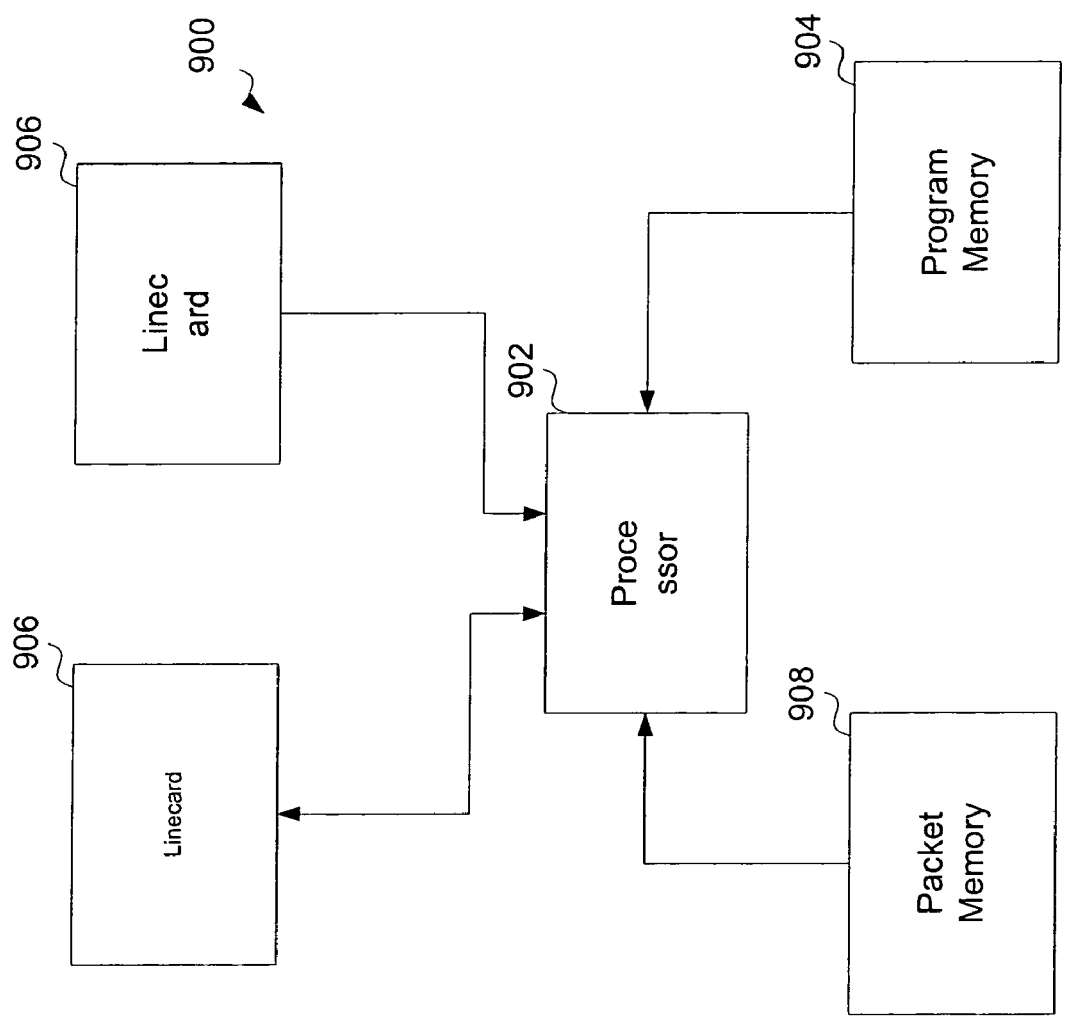
FIG. 9 depicts a network device useful in implementing embodiments of the present invention.

FIG. 9 depicts a network device 900 that may be used to implement, e.g., any of the network elements of FIG. 1. In one embodiment, network device 900 is a programmable machine that may be implemented in hardware, software, or any combination thereof. A processor 902 executes codes stored in a program memory 904. Program memory 904 is one example of a computer-readable medium. Program memory 904 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is another example of a computer-readable medium.

Network device 900 interfaces with physical media via a plurality of linecards 906. Linecards 906 may incorporate Ethernet interfaces, DSL interfaces, Gigabit Ethernet interfaces, 10-Gigabit Ethernet interfaces, SONET interfaces, etc. As packets are received, processed, and forwarded by network device 900, they may be stored in a packet memory 908. Network device 900 implements all of the network protocols and extensions thereof described above as well as the policing features provided by the present invention. To implement functionality according to the present invention, linecards 906 may incorporate processing and memory resources similar to those discussed above in connection with the network device as a whole.

CONCLUSION

It will be appreciated then that HMMP gives preference to packets of higher precedence levels in the case of congestion. It has been found that in the case of persistent congestion, after the system stabilizes, all higher precedence levels that fit in the maximum R (or R(i)) will not experience packet drops while packets of lower precedence levels are selectively dropped.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a network device comprising a multi-rate multi-precedence policer, said method comprising:
   providing a plurality of packet precedence levels;
   providing a token bucket for each of said packet precedence levels;
   receiving a packet comprising a precedence level;
   determining a credit available in the token bucket associated with said received packet's precedence level;
   determining a policer operation for said received packet based on the token bucket associated with said received packet's precedence level, wherein determining a policer operation comprises determining whether to keep, drop, or remark said received packet; and
   upon receipt of said received packet having precedence j and length L, if token counts T(j)−L>=0, changing token counts T(k) for all k<=j;
   wherein said received packet affects traffic measured by said token bucket associated with said received packet's precedence level and all token buckets associated with precedence levels below said received packet's precedence level.

2. The method of claim 1 wherein each of said token buckets is programmed with a maximum allowed rate NesR(i) representing a maximum allowed rate of traffic aggregated over all the precedence levels above and including precedence level i and further programmed with a depth NesB(i), and token counts T(i) of said token buckets Bi are updated every INT seconds, DEF(i) is the number of tokens missing in said token bucket Bi to fill said token bucket Bi, MaxT(i)=NesR(i)*INT, and INC(i)=Min [Max T(i), DEF(i)]; and further comprising:
   incrementing all the token counts T(i) by INC(i) every INT seconds; and
   upon receipt of said received packet, said received packet having precedence j and length L, determining whether T(j)−L>0;
   if T(j)−L<0, dropping said received packet;
   if T(j)−L>=0 setting T(k)=T(k)−L for all k<=j.

3. The method of claim 1 wherein each of said token buckets is programmed with a maximum allowed rate NesR(i) representing a maximum allowed rate of traffic aggregated over all the precedence levels above and including precedence level i and further programmed with a depth NesB(i), and LastTime is a time of last update of said token buckets, CurrentTime is a current real time, DeltaTime is a difference between CurrentTime and LastTime, MaxT(i)=NesR(i)*DeltaTime, T(i) is a token count of bucket (i), DEF(i)=NesB(i)−T(i), and INC(i)=Min [Max T(i), DEF(i)]; and further comprising:

upon receipt of said received packet, said received packet having precedence j and length L performing the following:
setting T(k)=T(k)+INC(k) for all of said token buckets;
if T(j)−L<0, dropping said received packet;
if T(j)−L>=0 setting T(k)=T(k)−L for all k<=j.

4. A method for operating a network device comprising a multi-rate multi-precedence policer, said method comprising:
providing a plurality of packet precedence levels;
providing a token bucket for each of said packet precedence levels;
receiving a packet comprising a precedence level;
determining a credit available in the token bucket associated with said received packet's precedence level;
determining a policer operation for said received packet based on the token bucket associated with said received packet's precedence level, wherein determining a policer operation comprises determining whether to keep, drop, or remark said received packet; and
for each of the token buckets (i), starting with a highest precedence level and continuing to a lowest precedence level, setting DEF(i)=B(i)−T(i), wherein DEF(i) is a number of tokens missing in the token bucket (i) to fill the token bucket, B(i) is a depth of the token bucket (i) corresponding to precedence level (i), and T(i) is a token counter for token bucket Bi;
wherein said received packet affects traffic measured by said token bucket associated with said received packet's precedence level and all token buckets associated with precedence levels below said received packet's precedence level.

5. The method of claim 4 wherein R(i) is a maximum allowed rate of traffic for precedence level (i), R is a maximum allowed aggregate rate across all precedence levels, INT is an update interval, RemT is a variable that tracks remaining tokens to be allocated across precedence levels in a given interval, MaxT(i)=R(i)×INT, INC(i)=a number of tokens actually added to a token bucket (i) in a given interval, B(i) is the depth of the token bucket Bi;
and further comprising:
every interval INT,
initializing RemT=R*INT; and
for each token bucket i, starting from a highest precedence level and continuing to a lowest precedence level:
setting INC(i)=Min [DEF(i), MaxT(i), RemT];
T(i)=T(i)+INC(i); and
RemT=Max [RemT−INC(i), 0].

6. The method of claim 5 further comprising:
upon receipt of said received packet, said received packet having precedence j and length L, determining whether T(j)−L>0;
if T(j)−L<0, dropping said received packet;
if T(j)−L>=0 setting T(j)=T(j)−L.

7. The method of claim 4 wherein R(i) is a maximum allowed rate of traffic for precedence level (i), R is a maximum allowed aggregate rate across all precedence levels, LastTime is a time of last update of said token buckets, CurrentTime is a current real time, DeltaTime is a difference between CurrentTime and LastTime, MaxT(i)=R(i)*DeltaTime, RemT is a variable that tracks tokens to be allocated across precedence levels in a given interval; and further comprising:
upon receipt of said received packet, said received packet having precedence j and length L,
determining whether T(j)−L>0;
setting RemT=R*DeltaTime;
for each of said token buckets, starting with a highest precedence level and continuing to a lowest precedence level;
setting INC(i)=Min [DEF(i), MaxT(i), RemT];
setting RemT=Max [RemT−INC (i), 0];
setting LastTime=CurrentTime;
determining whether T(j)−L>0;
if T(j)−L<0, dropping said received packet;
if T(j)−L>=0 setting T(j)=T(j)−L.

8. A method for operating a network device comprising a multi-rate multi-precedence policer, said method comprising:
providing a plurality of packet precedence levels;
providing a token bucket for each of said packet precedence levels;
receiving a packet comprising a precedence level;
determining a credit available in the token bucket associated with said received packet's precedence level;
determining a policer operation for said received packet based on the token bucket associated with said received packet's precedence level, wherein determining a policer operation comprises determining whether to keep, drop, or remark said received packet; and
wherein said received packet affects traffic measured by said token bucket associated with said received packet's precedence level and all token buckets associated with precedence levels below said received packet's precedence level; and
wherein R(i) is a maximum allowed rate of traffic for precedence level (i), r(i) is a guaranteed rate of traffic for precedence level (i), R is a maximum allowed aggregate rate across all precedence levels, and B(i) is a depth of token bucket (i) corresponding to precedence level (i).

9. The method of claim 8 wherein
wherein LastTime is a time of last update of said token buckets, CurrentTime is a current real time, and T(i) is a token counter for token bucket (i); and further comprising:
upon receipt of said received packet, said received packet having precedence j and length L,
setting DeltaTime=CurrentTime−LastTime;
setting RemT=R*DeltaTime;
for each of said token buckets, starting with a highest precedence level and continuing to a lowest precedence level,
setting DEF(i)=B(i)−T(i);
setting MaxT(i)=R(i)*DeltaTime;
setting MinT(i)=r(i)*DeltaTime;
setting DiffT(i)=MaxT(i)−MinT(i);
setting INC(i)=Min (DEF(i), MinT(i), RemT);
setting T(i)=T(i)+INC(i);
setting DEF(i)=B(i)−T(i);
setting RemT=Max[RemT−INC(i), 0];
for each of said token buckets, starting with a highest precedence level and continuing to a lowest precedence level,
setting INC(i)=Min (DEF(i), DiffT(i), RemT);
setting T(i)=T(i)+INC(i); and
setting RemT=Max [RemT−INC(i), 0]; and
setting LastTime=CurrentTime; and
determining whether T(j)−L>0;
if T(j)−L<0, dropping said received packet; and
if T(j)−L>=0 setting T(j)=T(j)−L.

10. The method of claim 8 wherein INT is an update interval, T(i) is a token counter for token bucket (i), RemT is a variable that tracks remaining tokens to be allocated across precedence levels in a given interval, Def(i) is a number of tokens missing in token bucket B(i) to fill the bucket, MaxT(i)=R(i)×INT, MinT(i)=r(i)*INT, and INC(i)=a number of tokens actually added to a token bucket (i) in a given interval; and further comprising:
  every interval INT,
  initializing RemT=R*INT; and
  for each token bucket i, starting from a highest precedence level and continuing to a lowest precedence level:
    setting DEF(i)=B(i)−T(i);
    setting DiffT(i)=MaxT(i)−MinT(i);
    setting INC(i)=Min (DEF(i), MinT(i), RemT);
    setting T(i)=T(i)+INC(i);
    setting DEF(i)=B(i)−T(i); and
    setting RemT=Max [RemT−INC(i), 0];
  for each token bucket i, starting from a highest precedence level and continuing to a lowest precedence level:
    INC(i)=Min (DEF(i), DiffT(i), RemT)
    T(i)=T(i)+INC(i); and
    RemT=Max[RemT−INC(i), 0].

11. The method of claim 10 further comprising:
  upon receipt of said received packet, said received packet having precedence j and length L, determining whether T(j)−L>0;
  if T(j)−L<0, dropping said received packet;
  if T(j)−L>=0 setting T(j)=T(j)−L.

12. A computer readable storage medium encoded with a computer program for operating a packet policer, said computer program comprising:
  code that provides a token bucket corresponding to each of a plurality of packet precedence levels;
  code that causes received traffic to be limited in accordance with rates corresponding to precedence levels to which packets of said received traffic are assigned;
  code that causes received traffic to affect the token buckets associated with precedence levels below said precedence level to which packets of said received traffic are assigned such that credit in the token buckets associated with precedence levels below said received packet's precedence level is available for use by said received packet; and
  code that causes packets of the lowest possible precedence levels to be dropped or remarked to assure conformance to said rates.

13. The computer readable storage medium of claim 12 wherein said rates comprise a maximum rate R for each of said precedence levels.

14. The computer readable storage medium of claim 12 wherein said rates comprise a maximum rate R(i) for each precedence level (i).

15. The computer readable storage medium of claim 12 wherein said rates comprise a maximum rate R(i) and a guaranteed rate r(i) for each of said precedence levels.

16. The computer readable storage medium of claim 12 wherein said rates comprise a maximum rate NesR(i) representing a maximum allowed traffic over all precedence levels (i) and above.

17. The computer readable storage medium of claim 12 wherein said rates comprise a maximum rate NesR(i) representing a maximum allowed traffic over all precedence levels (i) and above and a guaranteed rate Nesr(i) representing a guaranteed rate over all precedence levels (i) and above.

18. A method of operating a network, said method comprising:
  assigning a plurality of calls to a plurality of precedence levels such that packets belong to a call are assigned a corresponding precedence levels, wherein a token bucket corresponds to each of said packet precedence levels;
  operating a policer to police traffic generated by said calls by:
    limiting said received traffic in accordance with rates corresponding to said precedence levels; and
    dropping or remarking packets of the lowest possible precedence levels to assure conformance to said rates;
  wherein received traffic affects the token buckets associated with precedence levels below said precedence level to which packets of said received traffic are assigned such that credit in the token buckets associated with precedence levels below said received packet's precedence level is available for use by said received packet.

19. The method of claim 18 wherein said rates comprise a maximum rate R for each of said precedence levels.

20. The method of claim 18 wherein said rates comprise a maximum rate R(i) for each precedence level (i).

21. The method of claim 18 wherein said rates comprise a maximum rate R(i) and a guaranteed rate r(i) for each of said precedence levels.

22. The method of claim 18 wherein said rates comprise a maximum rate NesR(i) representing a maximum allowed traffic over all precedence levels (i) and above.

23. The method of claim 18 wherein said rates comprise a maximum rate NesR(i) representing a maximum allowed traffic over all precedence levels (i) and above and a guaranteed rate Nesr(i) representing a guaranteed rate over all precedence levels (i) and above.

24. Apparatus for operating a packet policer, said apparatus comprising:
  a processor;
  a memory device that stores:
    code that provides a token bucket corresponding to each of a plurality of packet precedence levels;
    code that causes received traffic to be limited in accordance with rates corresponding to said precedence levels to which packets of said received traffic have been assigned;
    code that causes received traffic to affect the token buckets associated with precedence levels below said precedence level to which packets of said received traffic are assigned such that credit in the token buckets associated with precedence levels below said received packet's precedence level is available for use by said received packet; and
    code that causes packets of the lowest possible precedence levels to be dropped or remarked to assure conformance to said rates.

25. The apparatus of claim 24 wherein said rates comprise a maximum rate R for each of said precedence levels.

26. The apparatus of claim 24 wherein said rates comprise a maximum rate R(i) for each precedence level (i).

27. The apparatus of claim 24 wherein said rates comprise a maximum rate R(i) and a guaranteed rate r(i) for each of said precedence levels.

28. The apparatus of claim 24 wherein said rates comprise a maximum rate NesR(i) representing a maximum allowed traffic over all precedence levels (i) and above.

29. The apparatus of claim 24 wherein said rates comprise a maximum rate NesR(i) representing a maximum allowed traffic over all precedence levels (i) and above and a guaranteed rate Nesr(i) representing a guaranteed rate over all precedence levels (i) and above.

* * * * *